(12) United States Patent
Scheibelhoffer et al.

(10) Patent No.: US 6,465,558 B2
(45) Date of Patent: Oct. 15, 2002

(54) SOLVENT BASED ADHESIVE COMPOSITION

(75) Inventors: Anthony S. Scheibelhoffer, Norton; Andrew M. Rohn, Clinton; James T. Kempthorn, Cuyahoga Falls, all of OH (US); Kenneth D. Zabielski, McHenry, IL (US); Deenadayalu Chundury, Newburgh, IN (US); Timothy W. Birch, Ravenna, OH (US)

(73) Assignee: Ferro Corporation, Cleveland, OH (US)

( * ) Notice: Subject to any disclaimer, the term of this patent is extended or adjusted under 35 U.S.C. 154(b) by 0 days.

(21) Appl. No.: 09/777,148

(22) Filed: Feb. 5, 2001

(65) Prior Publication Data

US 2001/0034386 A1 Oct. 25, 2001

Related U.S. Application Data

(60) Provisional application No. 60/179,978, filed on Feb. 3, 2000.

(51) Int. Cl.$^7$ .............................. C08K 5/34; C08K 5/01; C08K 5/07
(52) U.S. Cl. .................... 524/483; 524/481; 524/484; 524/356; 524/357; 524/354; 524/315; 524/98
(58) Field of Search ................................ 524/481, 483, 524/484, 356, 357, 354, 315, 98

(56) References Cited

U.S. PATENT DOCUMENTS

| 5,080,978 A | * | 1/1992 | Kulzick et al. ............. 428/483 |
| 5,264,280 A | | 11/1993 | Chundury et al. .......... 428/330 |
| 5,374,680 A | | 12/1994 | Chundury et al. ............ 525/71 |
| 5,385,781 A | | 1/1995 | Chundury et al. .......... 428/330 |

* cited by examiner

Primary Examiner—Kriellion A. Sanders
(74) Attorney, Agent, or Firm—Rankin, Hill, Porter & Clark LLP

(57) ABSTRACT

This invention relates to a solvent based adhesive composition including a major amount of a solvent system and a minor amount of an adhesive polymer system. The solvent system preferably includes a terpene and an aldehyde, ketone, or an aromatic solvent. The adhesive polymer system preferably includes one or a blend of polymers that dissolve, at least in part, in the solvent solution. The components of the solvent adhesive are compatible in that they do not separate upon standing. The solvent based adhesive composition provides good adhesion between polymer articles such as, for example, polyolefin and acrylic films, as well as good adhesion between polymeric articles and wood or metal substrates.

21 Claims, No Drawings

SOLVENT BASED ADHESIVE COMPOSITION

RELATED APPLICATIONS

This application claims the benefit of U.S. Provisional Application Ser. No. 60/179,978, filed Feb. 3, 2000.

FIELD OF INVENTION

The present invention concerns a solvent based adhesive composition for bonding polymer articles together, and more particularly an adhesive composition comprising a solvent system and an adhesive polymer system.

BACKGROUND OF THE INVENTION

Solvent based adhesive compositions are used to adhere one polymer article to another polymer article or to bond polymer articles to other substrates such as wood or metal. These adhesive compositions generally work by providing an adhesive polymer in solution. The adhesive composition is applied to at least one of the polymer articles to be bonded and then the solvent is removed to set the adhesive. Adhesive compositions of this type are believed to work by partially dissolving or swelling the polymer articles and using the dissolved polymer as a seal. They may also work by depositing adhesive materials having surface energies that are matched to the surface energies of the materials being joined.

One of the problems encountered when attempting to bond polymer articles together or to other substrates is the incompatibility of the materials. For instance, it is very difficult to adhere to polymers such as acrylics to polymer such as polyolefins. Due to the low solubility and low surface energy of polyolefins, it is difficult, in general, to obtain good adhesion to polyolefins.

In addition to bonding different polymer articles together, it is often difficult to bond polymer articles to wood or metal substrates. This is especially true for polyolefin films or substrates. Typically films are adhered to wood or metal substrates by heat lamination of the film onto the substrate. However, it is often difficult with polyolefin films to provide the adhesion necessary to prevent delamination.

It is desirable to have a binding composition having a compatible polymer that can provide the adhesion needed to attach the desired polymer articles together. It would be desirable to have an adhesive composition that could bond polymer articles together, and also could bond polymer articles to wood or metal substrates.

SUMMARY OF THE INVENTION

This invention relates to a solvent based adhesive composition comprising a major amount of a solvent system comprising one or more solvents having solubility parameters within the range of from about 7.5 to about 10 $(cal/cm^3)^{1/2}$, and a minor amount of an adhesive polymer system comprising one or more adhesive polymers dissolved in the solvent system. In one embodiment, the solvent system comprises the combination of a terpene and an aldehyde, ketone, or an aromatic solvent. The invention also relates to a method of bonding a polymer article to a substrate comprising the steps of providing a polymer article and a substrate, applying a solvent based adhesive composition according to the invention to a portion of the polymer article and/or substrate that are to be adhered together, evaporating at least a portion of the solvent, and pressing the polymer and substrate together at an elevated temperature.

The solvent based adhesive composition provides good adhesion between polymer articles, and in particular between acrylic and polyolefin films. The solvent based adhesive composition also provides good adhesion between polymer articles, and in particular polymer films, and metal or wood substrates.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION

As described herein, the term "compatible" means that the components used in the adhesive composition remain stable at operating conditions. In one sense, the term "compatible" refers to the ability of the solvent based adhesive composition to form a solution or dispersion which does not form inseparable phases at operating conditions. For instance, at room temperature the components may separate but upon heating mildly to approximately 80–90° F. and mild stirring, the components form a stable dispersion which is useful as a solvent based adhesive composition.

As used in the instant specification and in the appended claims, the term "solubility parameter" and its values are defined in *Polymer Handbook*, Third Edition, J. Brandrup, E. H. Immergut, Editors, 3rd Edition (1989), pgs. 519 et seq., which is hereby incorporated by reference. The *Polymer Handbook* provides a listing of the solubility parameters for many common solvents and polymers, but it may be necessary to calculate the parameters of the solvent using the guidelines set forth in the *Polymer Handbook* or using other scientifically acceptable methods, which are known.

The term adhesive polymer is understood to mean a polymer that provides bonding in the context of the solvent based adhesive composition. An adhesive to polymer must be soluble or dispersible, at least in part, in the solvent system.

As described above, the invention relates to solvent based adhesive composition that comprises a major amount (i.e., more than about 50% by weight) of a solvent system and a minor amount (i.e., less than about 50% by weight) of an adhesive polymer system. The adhesive polymer system or adhesive polymers are sometimes referred to herein as the solids. Typically the solvent based adhesive composition has from about 5 to about 10, or from about 6 to about 9, or from about 7 to about 8 parts of solvent system for each part of solids. Here and elsewhere in the specification and claims, the range and ratio limits may be combined. Each of the components of the adhesive composition is discussed below.

Solvent System

The solvent system comprises one or more solvents having solubility parameters from about 7.5 to about 10, or from about 7.9 to about 9.0, or from about 8.1 to about 8.8 $(cal/cm^3)^{1/2}$. The solvents must disperse or dissolve the adhesive polymer system. Solvents that may be used include terpenes, aldehydes, ketones, diacetone alcohol, ethylene glycol ethers, such as diethylene glycol monoethyl ether and ethylene glycol dimethyl or monobutyl ether, alkyl acetates, such as ethyl or butyl acetate, alkyl caprolactams, such as methyl or ethyl caprolactams, and furane.

In one preferred embodiment, the solvent system comprises a combination of a terpene and an aldehyde and/or a ketone or an aromatic solvent. The terpene is generally present in the solvent in an amount from about 2 to about 20, or from about 5 to about 15, or from about 6 to about 12 parts of terpene for every part of aldehyde, or to ketone by weight.

The terpenes include sesquiterpenes and oxidized terpene derivatives thereof. The terpene may be monocyclic, dicyclic or acyclic compounds. Suitable terpenes include, but are not limited to: dipentene, limonene, citral, pinene, carvone, citronellal, myrcene, ocimene, linalool, phellandrene, carvacrol, and thymol. The terms dipentene or limonene include d-limonene, l-limonene and mixtures of the two. Many commercially available terpenes are alcohols derived from terpenes. Sesquiterpenes include, but are not limited to: cadinene, and caryophyllene. In one embodiment, the terpene is limonene. The aldehydes or ketones generally contain from about 2 to about 20, or from about 3 to about 18, or from about 4 to about 10 carbon atoms. The aldehyde or ketone may be aliphatic or cyclic. The aldehydes include butanal, pentaldehyde, hexaldehyde, heptaldehyde, octanal, nonanal, and decaldehyde. The ketone may be linear or cyclic butanone, pentanone, hexanone, heptanone, octanone, nonanone or decanone. In a preferred embodiment, the aldehyde or ketone is a linear or cyclic heptanone or hexanone. For medical application it is preferred that heptanone is used as the aldehyde or ketone.

In another embodiment, one or more of the solvents in the solvent system comprises an aromatic solvent. Suitable aromatic solvents include benzene and substituted benzenes, such as toluene, xylene, etc. Toluene is particularly useful with the polymers containing a vinyl aromatic monomers.

Adhesive Polymer System

The solvent based adhesive composition according to the present invention also At comprises an adhesive polymer system comprising one or a blend of adhesive polymers. The polymers in the adhesive polymer system will generally have a solubility parameter of about 7.5 to about 10, or from about 7.9 to about 9.0, or from about 8.1 to about 8.8 $(cal/cm^3)^{1/2}$. The polymers may be any of those which provide the ability to adhere polymer articles and which are compatible with the solvent. The polymers include copolymers or terpolymers of one or more olefins, such as aliphatic or aromatic olefins, and functionalized derivatives thereof, ethylene, propylene, or a member of the homologous series of olefins polymerized with vinyl acetate, acrylic or methacrylic acid or their esters, a diene, such as butadiene or isoprene or their hydrogenated derivatives thereof and mixtures thereof. The polymers may be block or graft polymers, including diblock, triblock, multi block, radial block and random block copolymers. The solvent adhesive may contain a single polymer or a combination of one or more polymers.

The polyolefins used in the adhesive polymer system generally are semi-crystalline or crystallizable olefin polymers including copolymers, terpolymers, or mixtures thereof. These polymers are prepared from olefins, which typically contain from about 2 to about 20, or from about 2 to about 8, or from about 2 to about 6 carbon atoms. The polyolefins may be derived from olefins such as ethylene, propylene, 1-butene, 1-pentene, 4-methyl-1-pentene, 1-hexene, 1-octene, 1-decene, 4-ethyl-1-hexene, styrene, substituted styrene, or mixtures of two or more of these olefins. Examples of particularly useful olefin polymers include low-density polyethylene, high-density polyethylene, linear low density polyethylene, ultra low density polyethylene, polypropylene (including isotactic polypropylene), poly(1-butene), poly(4-methyl-1-pentene), ethylene-based ionomers, ethylene-propylene copolymers, ethylene-$C_{4-12}$ olefin copolymers, a-olefins, etc. Preferred polyolefins are polypropylene and ethylene propylene copolymers and ethylene-olefin copolymers. The polyolefins are well-known to those skilled in the art and many are available commercially. Examples of commercially available polyolefins include ethylene and propylene copolymers, atactic or isotactic polypropylene and copolymers such as Shell's 7C54H and 7C06 or Exxon's PP1012, PD 7132 and PD7163, orAristech's 4040F.

The adhesive polymer system may also comprise polymers produced utilizing metallocene catalysts. Most preferred are those ethylene based copolymer plastomers sold under the trademark Exact®, available from Exxon Chemical Company, Fusabond®, available from DuPont Chemical, and Engage® available from DuPont Dow Elastomers. These polymers are ethylene-alpha-olefin copolymers. These olefins generally contain from about 3 to about 12 or from about 4 to about 10, or from about 4 to about 8 carbon atoms. The alpha-olefins include butene, pentene, hexene, heptene, octene, nonene, and decene. Examples of commercially available ethylene-alpha-olefin copolymers include those from Exxon Chemical such as EXACT® 3035 (Butene), EXACT® 4033 (Butene), EXACT® 4041 (Butene), and those from DuPont Dow Elastomers such as ENGAGE® 8100 (Octene), ENGAGE® 8150 (Octene), ENGAGE® 8200 (Octene).

Processes useful in preparing the ethylene propylene copolymers are well-known to those skilled in the art and many such copolymers are available commercially. Such random copolymers may be prepared by any of a number of methods known in the art including those set forth in the *Encyclopedia of Polymer Science & Engineering*, Vol. 13, 2nd edition, Wiley & Sons, pp. 500-et seq. (and footnotes cited therein), which is fully incorporated by reference herein. Ethylene propylene copolymers useful in the present invention are available commercially. Examples of these copolymers include Atofina Y-8573 and Z-7650 available from Atofina, Dallas, Tex., U.S.A and Soltex 4208 available from Soltex Polymer Corporation, Houston, Tex., U.S.A.

In another embodiment the adhesive polymer system may comprise a copolymer of an olefin, such as an alpha-olefin, and an alpha, beta unsaturated carboxylic reagent, such as an acrylic or methacrylic acid or ester. The olefins are described above.

The alpha, beta unsaturated carboxylic reagent may be mono- or dicarboxylic acid reagent. The carboxylic reagents include carboxylic acids, esters, and salts. The monobasic alpha, beta-unsaturated carboxylic acid reagents include acrylic, methacrylic, cinamic, crotonic acids, esters, such as esters having from 1 to about 12 carbon atoms and salts such as sodium, calcium or magnesium. Examples of dicarboxylic reagents include maleic acid, maleic anhydride, fumaric acid, mesaconic acid, himic anhydride, itaconic acid, citraconic acid, itaconic anhydride, citraconic anhydride, monomethyl maleate, monosodium maleate, etc. A particularly preferred alpha, beta-unsaturated carboxylic reagent is maleic anhydride. The maleic anhydride may be used with other copolymerizable monomers such as acrylic or methacrylic acids or esters, malimide and bis-malimide, or with other monomers to introduce functional groups such as alcohols, mercaptans, silanols, epoxy compounds, oxazoline and the salts thereof.

In one embodiment, the alpha-olefins contain from 2 to about 6 carbon atoms and more preferably, the alpha-olefin is ethylene, propylene or a mixture of ethylene and propylene. Specific examples of esters characterized by the above formula which are useful include methyl acrylate, ethyl acrylate, butyl acrylate, methyl methacrylate, ethyl methacrylate, ethyl ethacrylate, etc. A preferred ester is methyl acrylate.

The copolymer may comprise from about 40 to about 95% by weight of the alpha-olefin and from about 5 to about 60% by weight of the carboxylic acid ester. In another embodiment the copolymers contain from about 15 to 25% by weight of the carboxylic ester and about 75 to about 85% of ethylene. The copolymers can be prepared by procedures well known to those skilled in the polymer art, and such elastomers are available commercially. Examples of specific elastomers include ethylene methyl acrylate copolymers (EMAC) such as those commercially available from Eastman under the designations SP2205, SP2255 and SP2260 having methyl acrylate contents of 20%, 18% and 24% by weight, respectively; from Exxon under the general trade designations Escor® and available in commercial grades designated, e.g., TC110 and TC112 containing 20% and 18% methyl acrylate, respectively. Developmental Escor® grade copolymers are also available from Exxon containing from 6% by weight of methyl acrylate (XS 1 1.04) to 28% by weight of methyl acrylate (XS 21.04 and 55.48). Lotryl® 3610 is an ethylene-methyl acrylate copolymer having a methyl acrylate content of 29% by weight and is available from Atochem, Inc. Some developmental EMAC are also available from Eastman under trade designations such as TD1956, TS1967, TD1972 and another TD1972. These contain 6%, 35%, 42% by weight of methyl acrylate, respectively.

Also useful as copolymers are ethylene ethyl acrylates (EEA) such as those available from Union Carbide under the Bakelite® designations DPD-6182, DPD-6169 T5 and DPDA 9169. EBAs (ethylene butyl acrylates) are available from Atochem, Inc. under designations such as 17BG04 (15–18% ester content) and 30BA02 (28–32% ester content).

In another embodiment, the adhesive polymer system comprises a reaction of at least one polyolefin and an alpha, beta-unsaturated carboxylic acid reagent. The alpha, beta unsaturated carboxylic acid reagents and the polyolefins have been described above. The amount of carboxylic acid reagent reacted with the polyolefin may range from about 0.1% to about 30% or from about 0.2% to about 20%, or from about 0.2% to about 10% or up to about 5% by weight.

The reaction between the carboxylic acid reagent in the polyolefin can be effected by means known to those skilled in the art. For example, the reaction can be conducted in solutions by a melt process in the presence of a free radical initiator. The free radical initiators usually are either peroxides or various organic azo compounds. The amount of initiator utilized generally from about 0.01% to about 5% by weight based on the combined weight of the olefin and the carboxylic reagent.

An example of a commercially available maleic acid grafted polypropylene is Epolene® E-43 wax from Eastman Chemical Products, Inc. Epolene® E-43 has an acid number of 47 and an approximate number average molecular weight of 4500. Epolene® C-16 and C-18 waxes are maleic acid grafted polyethylenes with approximate molecular weights of 8000 and 4000, respectively. Maleated ethylene-propylene elastomers also are useful, and such elastomers are available from Exxon Chemical T5 Company under identification numbers 99-10, 99-14 and 99-26. These copolymers contain 77%, 64% and 43% of ethylene, respectively, and the maleated products contain 0.76%, 0.56% and 0.35% of maleic acid or anhydride, respectively.

Other examples of commercially available maleic acid anhydride containing polyolefins include terpolymers available from Elf Atochem under designations such as Lotader® 3200 (prepared from a mixture of 88% by weight ethylene, 9% by weight butyl acrylate and 3% maleic anhydride), Lotader® 6600 (70% ethylene, 27% acrylic ester and 3% maleic anhydride) etc.; ethylene vinyl acetate copolymers grafted with maleic anhydride (EVA-MAH) are available from Equistar.

In another embodiment, the adhesive polymer system comprises a polymer derived from a vinyl aromatic monomer. The vinyl aromatic monomer includes styrene and the various substituted styrenes. Specific examples of vinyl aromatic compounds such as represented by the above formula include, for example, in addition to styrene, alpha-methylstyrene, beta-methylstyrene, vinyl toluene, 3-methylstyrene, 4-methylstyrene, 4-isopropylstyrene, 2,4-dimethylstyrene, o-chlorostyrene, p-chlorostyrene, o-bromostyrene, 2-chloro-4-methylstyrene, etc. Styrene is the preferred vinyl aromatic compound.

The adhesive polymer system may also comprise a block polymer of a vinyl aromatic monomer and a conjugated diene, a partially hydrogenated derivative thereof, or a selectively hydrogenated derivative thereof to which has been grafted a unsaturated carboxylic reagent. The block polymers usually block copolymers, may be diblock, triblock, multi block, starblock, polyblock or graftblock polymers. Throughout this specification and claims, the terms diblock, triblock, multiblock, polyblock, and graft or grafted-block with respect to the structural features of block polymers are to be given their normal meaning as defined in the literature such as in the *Encyclopedia of Polymer Science and Engineering*, Vol. 2, (1985) John Wiley & Sons, Inc., New York, pp. 325–326, and by J. E. McGrath in *Block Copolymers, Science Technology*, Dale J. Meier, Ed., Harwood Academic Publishers, 1979, at pages 1–5, which are hereby incorporated by reference.

Such block polymers may contain various ratios of conjugated dienes to vinyl aromatic monomer. Accordingly, multi-block polymers may be utilized which are linear or radial symmetric or asymmetric and which have structures represented by the formulae A-B, A-B-A, A-B-A-B, B-A-B, $(AB)_{0,1,2}$- . . . BA, etc., wherein A is a polymer block of a vinyl aromatic monomer or a conjugated diene/vinyl aromatic monomer tapered polymer block, and B is a polymer block of a conjugated diene.

The block polymers may be prepared by any of the well-known block polymerization or copolymerization procedures including sequential addition of monomer, incremental addition of monomer, or coupling techniques as illustrated in, for example, U.S. Pat. Nos. 3,251,905; 3,390,207; 3,598,887; and 4,219,627. As well known, tapered polymer blocks can be incorporated in the multi-block copolymers by copolymerizing a mixture of conjugated diene and vinyl aromatic monomer monomers utilizing the difference in their copolymerization reactivity rates. Various patents describe the preparation of multi-block copolymers containing tapered copolymer blocks including U.S. Pat. Nos. 3,251,905; 3,639,521; and 4,208,356, the disclosures of which are hereby incorporated by reference.

Conjugated dienes which may be utilized to prepare the polymers and copolymers are those containing from 4 to about 10 carbon atoms and more generally, from 4 to 6 carbon atoms. Examples include from 1,3-butadiene, 2-methyl-1,3-butadiene (isoprene), 2,3-dimethyl-1,3-butadiene, chloroprene, 1,3-pentadiene, 1,3-hexadiene, etc. Mixtures of these conjugated dienes also may be used. The preferred conjugated dienes are isoprene and 1,3-butadiene.

The vinyl aromatic monomers which may be utilized to prepare the copolymers are described above. The preferred vinyl aromatic monomer is styrene.

Many of the above-described polymers of conjugated dienes and vinyl aromatic compounds are commercially available. The number average molecular weight of the block polymers, prior to hydrogenation, is from about 20,000 to about 506,000, or from about 40,000 to about 300,000.

The number average molecular weights of the individual blocks within the polymers may vary within certain limits. In most instances, the vinyl aromatic block will have a number average molecular weight in the order of about 2000 to about 125,000, or between about 4000 and 60,000. The conjugated diene blocks either before or after hydrogenation will have number average molecular weights in the order of about 10,000 to about 450,000 or from about 35,000 to 150,000.

Also, in one embodiment, prior to hydrogenation, the vinyl content of the block polymer is from about 10 to about 80%, and the vinyl content is from about 25 to about 65%, particularly 35 to 55% when it is desired that the modified block polymer exhibit rubbery elasticity. The vinyl content of the block polymer can be measured by means of nuclear magnetic resonance (NMR).

Specific examples of diblock polymers include styrene-butadiene, styrene-isoprene, and the hydrogenated derivatives thereof. Examples of triblock polymers include styrene-butadiene-styrene, styrene-isoprene-styrene, alpha-methylstyrene-butadiene-alpha-methylstyrene, alpha-methylstyrene-isoprene-alpha-methylstyrene, and their partially hydrogenated derivatives. The diblock and triblock polymers are commercially available from a variety of sources under various tradenames. An example of a commercially available diblock resin includes Solprene® 314D (Phillips). A number of styrene-butadiene-styrene triblock polymers are sold by Kraton Polymers under the trademarks Kraton® 2103, Kraton® 2104, and Kraton® 2113. Such thermoplastic rubbery block polymers are made by anionic polymerization, and the above three identified Kratons® differ in molecular weight and viscosity, and also in the ratio of butadiene to styrene. For example, Kraton® 2103 and Kraton® 2113 have a styrene to butadiene ratio of 28:72 while Kraton® 2104 as a styrene to butadiene ratio of 30:70. Blends of diblock and triblock polymers are also available. Kraton® 1118 is a blend of SB diblock and SBS triblock polymers. A particularly useful styrene-ethylene-propylene block copolymer is Kraton® G1701.

Multiblock polymers of styrene and either isoprene or butadiene also are commercially available. Commercially available and preferred styrene-butadiene multiblock polymers include Stereon® 841 A (43% styrene:57% butadiene) and Stereon® 845A which are available from The Firestone Tire & Rubber Company.

Radial or starblock copolymers are available from Atofina under the general designation Finaprene SBS Polymer. A particularly useful radial or starblock polymer is available commercially under the designation Finaprene 602D.

The selective hydrogenation of the block polymers may be carried out by a variety of well known processes including hydrogenation in the presence of such catalysts as Raney nickel, noble metals such as platinum, palladium, etc., and soluble transition metal catalysts. Suitable hydrogenation processes which can be used are those wherein the diene-containing polymer or polymer is dissolved in an inert hydrocarbon diluent such as cyclohexane and hydrogenated by reaction with hydrogen in the presence of a soluble hydrogenation catalyst. Such procedures are described in U.S. Pat. Nos. 3,113,986 and 4,226,952, the disclosures of which are incorporated herein by reference. Such hydrogenation of the block polymers which are carried out in a manner and to extent as to produce selectively hydrogenated polymers having a residual unsaturation content in the polydiene block from about 0.5 to about 20% of their original unsaturation content prior to hydrogenation.

In one embodiment, the conjugated diene portion of the block polymer is at least 90% saturated and more often at least 95% saturated while the vinyl aromatic portion is not significantly hydrogenated. Particularly useful hydrogenated block polymers are the hydrogenated block polymers of styrene-isoprene-styrene such as an (ethylene/propylene)-styrene block polymer. When a polystyrene-polybutadiene-polystyrene block polymer is hydrogenated, it is desirable that the 1,2-polybutadiene to 1,4-polybutadiene ratio in the polymer is from about 30:70 to about 70:30. When such a block polymer is hydrogenated, the resulting product resembles a regular polymer block of ethylene and 1-butene (EB). As noted above, when the conjugated diene employed is isoprene, the resulting hydrogenated product resembles a regular polymer block of ethylene and propylene (EP). One example of a commercially available selectively hydrogenated is Kraton® G-1652 which is a hydrogenated SBS triblock comprising 30% styrene end blocks and a mid-block equivalent is a polymer of ethylene and 1-butene (EB). This hydrogenated block polymer is often referred to as SEBS.

In another embodiment, the selectively hydrogenated block polymer is of the formula, $B_n(AB)_oA_p$, wherein n equals 0 or 1; o is 1 to 100; p is 0 or 1; each B prior to hydrogenation is predominantly a polymerized conjugated diene hydrocarbon block having a number average molecular weight of about 20,000 to about 450,000; each A is predominantly a polymerized vinyl aromatic monomer block having a number average molecular weight of from about 2,000 to about 115,000; the blocks of A constituting about 5% to about 95% by weight of the polymer; and the unsaturation of the block B is less than about 10% of the original unsaturation. In other embodiments, the unsaturation of block B is reduced upon hydrogenation to less than 5% of its original value, and the average unsaturation of the hydrogenated block polymer is reduced to less than 20% of its original value.

The block polymers of the vinyl aromatic monomer and the conjugated diene may also be grafted with one or more of the above described unsaturated monocarboxylic or dicarboxylic reagents. The carboxylic reagents include unsaturated carboxylic acids per se and their functional derivatives such as anhydrides, imides, metal salts, esters, etc., which are capable of being grafted onto the selectively hydrogenated block polymer. The grafted polymer will usually contain from about 0.2 to about 20%, and preferably from about 0.1% to about 10% by weight based on the total weight of the block polymer and the carboxylic reagent of the grafted carboxylic acid.

In order to promote the grafting of the carboxylic acid reagent to the hydrogenated block polymer, free radical initiators are utilized, and these initiators usually are either peroxides or various organic azo compounds. The amount of initiator utilized generally is from about 0.01% to about 5% by weight based on the combined weight of the combined polymer and the carboxylic reagent. The amount of carboxylic acid reagent grafted onto the block polymers can be measured by determining the total acid number of the product. The grafting reaction can be carried out by melt or solution mixing of the block polymer and the carboxylic acid reagent in the presence of the free radical initiator.

The preparation of various selectively hydrogenated block polymers of conjugated dienes and vinyl aromatic monomers which have been grafted with a carboxylic acid reagent is described in a number of patents including U.S. Pat. Nos. 4,578,429; 4,657,970; and 4,795,782, and the disclosures of these patents relating to grafted selectively hydrogenated block polymers of conjugated dienes and vinyl aromatic compounds, and the preparation of such compounds are hereby incorporated by reference. U.S. Pat. No. 4,795,782 describes and gives examples of the preparation of the grafted block polymers by the solution process and the melt process. U.S. Pat. No. 4,578,429 contains an example of grafting of Kraton® G1652 (SEBS) polymer with maleic anhydride with 2,5-dimethyl-2,5-di(t-butylperoxy) hexane by a melt reaction in a twin screw extruder. (See Col. 8, lines 40–61.)

Examples of commercially available maleated selectively hydrogenated polymers of styrene and butadiene include Kraton® FG1901, often referred to as a maleated selectively hydrogenated SEBS polymer.

In one embodiment, the adhesive polymer also is a combination of (a) a block polymer of a vinyl aromatic monomer and a conjugated diene, or a partially hydrogenated derivative thereof, or a selectively hydrogenated derivative thereof to which has been grafted a unsaturated carboxylic reagent, having greater than 60% by weight bound vinyl aromatic monomer and (b) a block polymer of a vinyl aromatic monomer and a conjugated diene, or a partially hydrogenated derivative thereof, or a to, selectively hydrogenated derivative thereof to which has been grafted a unsaturated carboxylic reagent, having less than about 50% by weight bound vinyl aromatic monomer. In one embodiment, the block copolymer (a) has greater than about 65%, or greater than about 70%, or greater than about 72% by weight bound vinyl aromatic monomer. In one embodiment, block polymer (b) has up to 48%, or up to 45% by weight bound vinyl aromatic monomer. The vinyl aromatic monomer and the conjugated diene are described above. In this embodiment, polymer (a) and polymer (b) are present in a weight ratio about (10–90):(10–90) or from about (30–70):(30:70) or from about (40–60):(40:60).

Examples of useful block polymers having greater than 60% by weight bound vinyl aromatic monomer include Phillips K-Resins® 03, 04 and 05, available from Phillips Petroleum Company. Generally, the K-Resins® have a high polystyrene content such as about 75%, and these resins are transparent and rigid. One particularly preferred block polymer is K-Resin® KR03 from Phillips. A similar material (75% styrene:25% butadiene) is available from Atofina under the designation Finaclear® 520.

In another embodiment, an adhesive polymer is a polymer of a vinyl aromatic monomer and a monomer selected from an unsaturated mono- or dicarboxylic reagent and other vinyl monomers. The carboxylic reagents include those described above, such as carboxylic acids per se and their functional derivatives such as anhydrides, imides, metal salts, esters, etc., which are capable of forming polymers with the vinyl aromatic monomer.

The copolymers of the vinyl aromatic monomers with maleic anhydride, N-substituted maleimides or metal salts of maleic acid are obtained, in one embodiment, by polymerizing equal molar amounts of styrene and the co-reactant, with or without one or more interpolymerizable comonomers. Procedures for preparing such copolymers are known in the art and have been described in, for example, U.S. Pat. No. 2,971,939.

In one embodiment, adhesive polymer system comprises a styrene-maleic anhydride copolymer. The styrene-maleic anhydride copolymers (SMA) are available commercially from, for example, ARCO under the general trade designation Dylark®. Examples include: Dylark® DBK-290 reported to comprise about 18% by weight of maleic anhydride and about 82% by weight of styrene; Dylark® 332 reported to comprise about 14% by weight of maleic anhydride and 86% by weight of styrene; and Dylark® 134 reported to comprise about 17% by weight of maleic anhydride, the balance being styrene.

Other Dylark® materials available also include transparent grades: Dylark® 132 (Vicat 109° C.), Dylark® 232 (Vicat 123° C.), and Dylark® 332 (Vicat 130° C.). Impact grades include Dylarks® 150, 250, 350 and 700 which are believed to be blends and/or grafts of SMA with SBR.

Other examples of impact modified styrenic and alphamethyl styrene copolymers with maleic anhydride and acrylonitrile include Arvyl® 300 MR and 300 CR.

Low molecular weight styrene-maleic anhydride copolymers (Mw as low as 1500) also are useful and these are available commercially such as from Monsanto Chemical Company under the designation Scripset® and from Atochem under the designation "SMA Resins". Sulfonated styrene-maleic anhydride copolymers (and their metal salts) also are available and useful in this invention. Two such products are available from Atochem: SMA-1000 which is a sulfonated copolymer of about 50% styrene and 50% maleic anhydride; and SMA 3000, a sulfonated SMA comprising about 75% styrene and 25% maleic anhydride.

Specific examples of copolymers of vinyl aromatic compounds include: styrene-acrylonitrile (SAN); styrene-acrylic acid; and styrene methacrylic acid.

In one embodiment, the adhesive polymer system comprises a combination of a polyolefin and a functionalized polyolefin. For example, the adhesive polymer system comprises a combination of a homopolypropylene or ethylene propylene copolymer and a maleated polypropylene. In another example, the adhesive polymer system can comprise a combination of an ethylene-octene copolymer and a functionalized polyolefin.

In another embodiment, the adhesive polymer system comprises an ethylene-vinyl acetate copolymer. The ethylene-vinyl acetate (EVA) copolymer may be any ethylene-vinyl acetate copolymer useful in preparing the polymer articles as described herein. The copolymers may be prepared by any known means such as free radical polymerization. Many ethylene-vinyl acetate copolymers are available commercially. The EVA generally contains at least about 5% by weight of vinyl acetate, generally, from about 5% to about 50% by weight of vinyl acetate. In one embodiment, ethylene-vinyl acetate copolymers have vinyl acetate contents from about 10%, or about 15%, or about 25% up to about 40%, or about 20% by weight. Ethylene vinyl acetate copolymers having a vinyl acetate content of 19% are particularly useful.

In general, the ethylene vinyl acetate copolymers have a melt flow range from about 0.1 to about 150 g/10 min., about 0.1 to about 10 g/10 min., or about 0.1 to about 2 g/10 min. The preparation of the EVA copolymers may be carried out according to known methods. A typical method of preparing EVA copolymers is found in U.S. Pat. No. 3,506,630 which is incorporated herein by reference. Another method of preparing EVA copolymers is described in U.S. Pat. No. 3,325,460 which is also incorporated by reference. The ethylene-vinyl acetate copolymers used in the present invention are available commercially and are known to those skilled in the art. Examples of commercially available ethylene-vinyl acetate copolymers include Elvax® 265, 3120, and 3165 available commercially from DuPont Chemical Company, grades 643 and 631 available commercially from Equistar, and Exxon 6D720.62 available commercially from Exxon Chemical.

In one embodiment, the adhesive polymer system comprises a mixture of one or more polymers. For example, the above ethylene vinyl acetate may be used with the above polyolefins or functionalized polyolefin. In one embodiment, the solvent adhesive composition contain a mixture of ethylene vinyl acetate copolymer and a functionalized polyolefins. The ethylene vinyl acetate copolymer is typically present in a major amount. In one embodiment, the ethylene vinyl acetate copolymer is present in an amount from about 50% to about 90%, or from about 55% to about 75%, or from about 60% to about 70% by weight of the solids. The functionalized polymer is typically present in an amount from about 10% to about 50%, or from about 25% to about 45%, or from about 30% to about 40% by weight of the solids. An example of such a combination is the combination of 65% of ethylene vinyl acetate copolymer (27.5% vinyl acetate) and 35% of a maleic anhydride grafted polypropylene.

In another embodiment, the adhesive polymer system comprises a combination of an ethylene vinyl acetate copolymer, a functionalized polyolefin and an ethylene olefin copolymer. An example of a such combination is the combination of 65% of ethylene vinyl acetate copolymer (27.5% vinyl acetate) and 35% of a maleic anhydride grafted polypropylene functionalized polymer. In this embodiment, the ethylene vinyl acetate copolymer is present in a major amount. In one embodiment, the ethylene vinyl acetate copolymer is present in an amount from about 50 to about 90, or from about 55 to about 75, or from about 60 to about 70 parts by weight of the solids. The functionalized polymer is typically present in an amount from about 10 to about 50, or from about 20 to about 45, or from about 25 to about 40 parts by weight of the solids. The ethylene olefin copolymer is typically present in an amount from about 1 to about 15, or from about 2 to about 10, or from about 3 to about 8 parts by eight of the solids. An example of a such combination is the combination of 65 parts of ethylene vinyl acetate copolymer (27.5% vinyl acetate) and 35 parts of a maleic anhydride grafted polypropylene and 5 parts of a terpolymer of ethylene, butyl acrylate and maleic anhydride.

In another embodiment, the adhesive polymer system comprises a combination of one or more of the above polymers with an aromatic olefin. For instance, the adhesive polymer system may comprise a combination of a copolymer of an aromatic olefin and a conjugated diene or hydrogenated derivative thereof and a functionalized polyolefin, such as a polyolefin derived from an aromatic olefin and a conjugated diene. In another embodiment, the adhesive polymer system comprises a combination of a hydrogenated styrene-butadiene or isoprene and a second styrene-butadiene or isoprene or a maleated styrene-butadiene or isoprene.

Preparation

The solvent based adhesive composition according to the present invention is prepared by dissolving the adhesive polymer system in the solvent system in the desired ratios as previously discussed above. When the adhesive polymer system comprises a blend of two or more polymers, it is often preferable for the polymers to be mixed in an extruder prior to being dissolved in the solvent system. However, blends of two or more polymers can be dissolved in the solvent system without first being extruder blended.

Stabilizers may be incorporated into the adhesive composition at any stage in the preparation, and preferably, stabilizers are included early to preclude the initiation of degradation so that the adhesive composition can be protected. Oxidative and thermal stabilizers include, for example, up to about 1% by weight, based on the weight of the solids, of hindered phenols, hydroquinones, aryl phosphites and various substituted derivatives of these materials and combinations thereof. Specific examples of hindered phenolic stabilizers include a family of hindered phenols available commercially from Ciba-Geigy under the trade designation Irganox® such as Irganox® 1010, Irganox® 1076, and Irganox® B-225. Irganox® 1010 is reported to be tetrakis [methylene (3,5-di-tert-butyl-4-hydroxy) hydrocinnamate] methane, Irganox® 1076 is n-octadecyl 3-(3,5-di-tert-butyl-4-hydroxy-phenyl) propionate. Irganox® B-225 is a combination of Irganox® 1010 and Ultranox® 168 (an aromatic phosphite).

Ultraviolet light stabilizers may be included in amounts of up to about 2% by weight based on the weight of the solids. Examples of ultraviolet light stabilizers include various substituted resorcinols, salicylates, benzotriazoles, benzophenones, etc. For certain applications, molded parts made from this material may be partially or completely exposed to U.V. light.

Suitable lubricants and mold release agents may be included in amounts of up to about 1% by weight based on the weight of the solids and can include materials such as stearic acid, stearic alcohol, stearamides. Plasticizers which may be included in amounts of up to about 20% by weight based on the weight of the solids include materials such as dioctylphthalate, dibenzylphthalate, butylbenzophthalate, hydrocarbon oils, epoxidized tall oil, and sulfonamides such as paratoluene ethyl sulfonamides.

Use

The adhesive composition according to the present invention may be used to bond polymer articles together, such as films to films. It may also be used to bond polymer articles, particularly films, to wood or metal substrates. This can be typically accomplished by applying a thin coating of the adhesive composition to the polymer article and/or the substrate. The thin coating of the adhesive composition may be applied by any means known to those in the art such as a doctor blade or a gravure method. At least a portion of the solvent is permitted to evaporate and then the polymer article and substrate are pressed together, preferably using heated rollers.

In another application method, the adhesive composition is applied to one of the polymer articles (for example a film) to be bonded to a substrate (for example a film), the solvent(s) in the adhesive composition are then partially or fully removed by drying. In the case of a film so treated with an adhesive composition, the film may be laminated to a hot substrate using heat and pressure.

The following examples are intended only to illustrate the invention and should not be construed as imposing limitations upon the claims:

EXAMPLE 1

Adhesive Composition 1 was prepared by extruder blending 64.8 parts by weight of ethylene vinyl acetate copolymer, 30.2 parts by weight of Exact® 4041 and 5 parts of Lotader® 3210. This blend of polymers was then dissolved in a solvent system comprising a mixture of 90% by weight d-limonene and 10% by weight 4-heptanone at a dilution of 10 parts by weight solvent system to 1 part by weight solids.

EXAMPLE 2

Adhesive Composition 2 was prepared by extruder blending 12.5 parts by weight KRO-3 (Phillips) with 25 parts by weight of Kraton® 1652. This blend of polymers was then dissolved in a solvent system comprising a mixture of 70% by weight toluene and 30% by weight d-limonene at a dilution of 8 parts by weight of solvent system for I part by weight of solids.

EXAMPLE 3

Adhesive Composition 3 was prepared by dry blending 2.5 parts by weight of KRO-3 (Phillips) with 10 parts by weight of Kraton® FG1901. This blend of polymers was then dissolved in a solvent system comprising a mixture of 61% by weight toluene and 26% by weight d-limonene at a dilution of 7 parts by weight of solvent system for 1 part by weight of solids.

EXAMPLE 4

Adhesive Composition 4 was prepared by extruder blending 1.25 parts by weight KRO-3 (Phillips) with 5 parts by weight of Kraton® FG1901 and 0.03 parts by weight of Dylark® 250. This blend of polymers was then dissolved in a solvent system comprising a mixture of 70% by weight toluene and 30% by weight d-limonene at a dilution of 8 parts by weight of solvent system for 1 part by weight of solids.

EXAMPLE 5

Adhesive Compositions A, B, C, and D, were prepared by dry blending the polymers in the amount shown in Table 1 below and then dissolving the blend of polymers in a solvent system comprising 70% by weight cyclohexanone and 30% by weight d-limonene at a dilution of 8 parts by weight of solvent system for 1 part by weight of solids.

|  | A | B | C | D |
|---|---|---|---|---|
| Exxon LD 760.36 | 64.8 | — | 64.8 | 64.8 |
| Exact ® 4041 | — | 30.2 | 30.2 | — |
| Lotader ® 3210 | — | — | — | 5 |

EXAMPLE 6

Each of the adhesive compositions prepared in Examples 1 through 5 above was applied to a black pigmented Korad® acrylic (80:20 MMA/BMA copolymer) film using a doctor blade. The substantial majority of the solvent(s) in the adhesive composition was evaporated from the black pigmented Korad® film by passing the film through a heated tunnel. The black pigmented Korad® film was then laminated to a white pigmented Optum® olefin alloy (primarily polypropylene and polystyrene and a compatibilizer) film available from Ferro Corporation using heated rollers. After the film was permitted to cool to ambient temperatures (about 25° C.), an attempt was made to delaminate the black pigmented Korad® film layer from the white pigmented Optum® film layer. Despite repeated efforts to mechanically separated the two films, substantial amounts of white pigmented film remained adhered to the black pigmented Korad@, indicating cohesive failure (i.e., failure of the Optum® layer) rather than adhesive failure.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed:

1. An adhesive composition comprising a major amount of a solvent system comprising one or more solvents, and a minor amount of an adhesive polymer system comprising one or more polymers, wherein said solvents and said polymers have solubility parameters within the range of from about 7.5 to about 10.0 $(cal/cm^3)^{1/2}$.

2. The adhesive composition according to claim 1 wherein said solvent system comprises at least one selected from the group consisting of terpenes, aldehydes, ketones, diacetone alcohols, ethylene gylcol ethers, alkyl acetates, alkyl caprolactams, furanes, and mixtures thereof.

3. The adhesive composition according to claim 1 wherein said solvent system comprises a terpene and an aldehyde, a ketone, and/or an aromatic solvent.

4. The adhesive composition according to claim 3 wherein said terpene is selected from the group consisting of dipentene, limonene, citral, pinene, carvone, citronellal, myrcene, ocimene, linalool, phellandrene, carvacrol, and thymol.

5. The adhesive composition according to claim 3 wherein said terpene is limonene.

6. An adhesive composition comprising a major amount of a solvent system comprising one or more solvents, and a minor amount of an adhesive polymer system comprising one or more polymers, wherein said solvents and said polymers have solubility parameters within the range of from about 7.5 to about 10.0 $(cal/cm^3)^{1/2}$, wherein said solvent system comprises a terpene and an aldehyde, a ketone, and/or an aromatic solvent, and wherein said aldehyde or ketone contains from about 2 to about 18 carbon atoms.

7. An adhesive composition comprising a major amount of a solvent system comprising one or more solvents, and a minor amount of an adhesive polymer system comprising one or more polymers, wherein said solvents and said polymers have solubility parameters within the range of from about 7.5 to about 10.0 $(cal/cm^3)^{1/2}$, wherein said solvent system comprises a terpene and an aldehyde, a ketone, and/or an aromatic solvent, and wherein said ketone is linear or cyclic butanone, pentanone, hexanone, heptanone, octanone, nonanone, or decanone.

8. The adhesive composition according to claim 3 wherein said aromatic solvent comprises benzene or a substituted benzene.

9. The adhesive composition according to claim 3 wherein said aromatic solvent comprises toluene.

10. The adhesive composition according to claim 1 wherein said adhesive polymer system comprises a polyolefin.

11. The adhesive composition according to claim 10 wherein said polyolefin comprises a homopolymer or a copolymer of an olefin.

12. The adhesive composition according to claim 11 wherein said olefin has from 2 to about 12 carbon atoms.

13. The adhesive composition according to claim 12 wherein the olefin is ethylene, propylene, butylene, or styrene.

14. The adhesive composition according to claim 1 wherein the adhesive polymer system comprises a blend of at least two different adhesive polymers.

15. The adhesive composition according to claim 14 wherein said at least two different adhesive polymers comprise homopolymers and copolymers of polyolefins and/or polymers derived from vinyl aromatic monomers.

16. An adhesive composition comprising a major amount of a solvent system comprising one or more solvents, and a minor amount of an adhesive polymer system comprising one or more polymers, wherein said solvents and said polymers have solubility parameters within the range of from about 7.5 to about 10.0 $(cal/cm^3)^{1/2}$, wherein said adhesive composition is used to adhere a first film layer comprising from 50% to about 100% by weight of a polymethacrylate ester or polyacrylate ester or their copolymers or blends thereof to a second film layer comprising a blend of from about 30% to about 70% by weight of an olefinic polymer or copolymer, from about 7% to about 65% by weight of an aromatic vinyl polymer or a copolymer thereof, and from about 5% to about 20% by weight of at least one block polymer of a vinyl aromatic monomer and an aliphatic conjugated diene, a selectively hydrogenated derivative thereof, or a selectively hydrogenated derivative thereof to which has been grafted a unsaturated carboxylic reagent or anhydride.

17. An adhesive composition comprising a minor amount of an adhesive polymer system dissolved in a major amount of a solvent system, said adhesive polymer system comprising at least two polymers having solubility parameters within the range of from about 7.5 to about 10.0 $(cal/cm^3)^{1/2}$ and said solvent system comprising at least two solvents having solubility parameters within the range of from about 7.5 to about 10.0 $(cal/cm^3)^{1/2}$, wherein adhesive polymer system comprises a blend of a major amount of an ethylene vinyl acetate copolymer and a minor amount of a metallocene catalyzed ethylene-alpha-olefin copolymer and said solvent system comprises a major amount of a terpene and a minor amount of a ketone.

18. The adhesive composition according to claim 17 wherein said terpene comprises d-limonene and said solvent comprises 4-heptanone.

19. An adhesive composition comprising a minor amount of an adhesive polymer system dissolved in a major amount of a solvent system, said adhesive polymer system comprising at least two polymers having solubility parameters within the range of from about 7.5 to about 10.0 $(cal/m^3)^{1/2}$ and said solvent system comprising at least two solvents having solubility parameters within the range of from about 7.5 to about 10.0 $(cal/cm^3)^{1/2}$, wherein adhesive polymer system comprises a blend of a major amount of a block polymer of a vinyl aromatic monomer and a minor amount of a maleated selectively hydrogenated polymer of styrene and butadiene and said solvent system comprises a major amount of an aromatic solvent or a ketone and a minor amount of a terpene.

20. The adhesive composition according to claim 19 wherein said aromatic solvent comprises toluene and said terpene comprises d-limonene.

21. The adhesive composition according to claim 19 wherein said ketone comprises cyclohexanone and said terpene comprises d-limonene.

* * * * *